L. BLOUNT.
MERRY-GO-ROUND.
APPLICATION FILED AUG. 20, 1912.
1,070,105.
Patented Aug. 12, 1913.
2 SHEETS—SHEET 2.
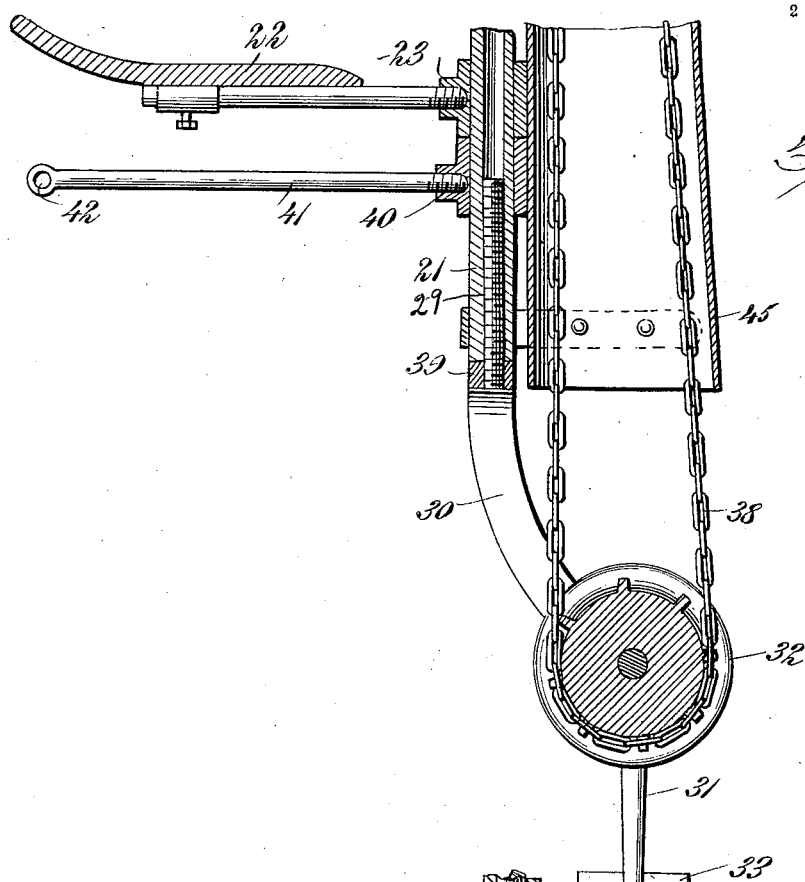
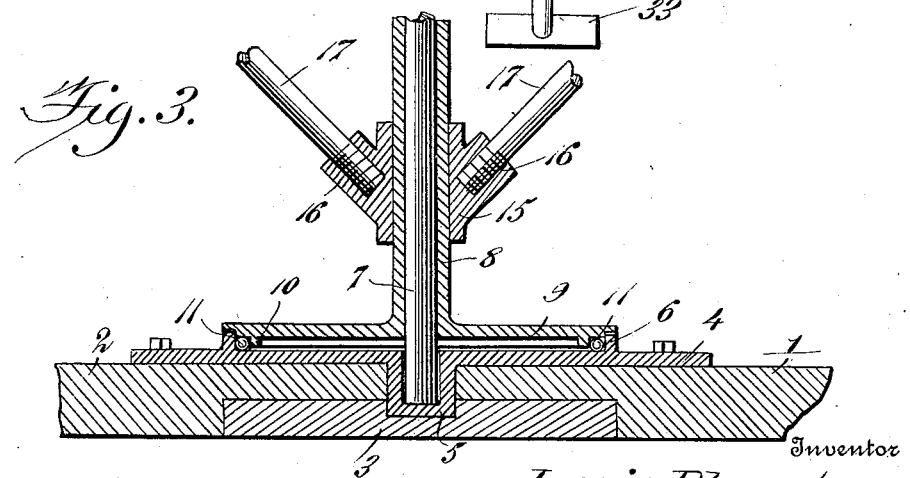

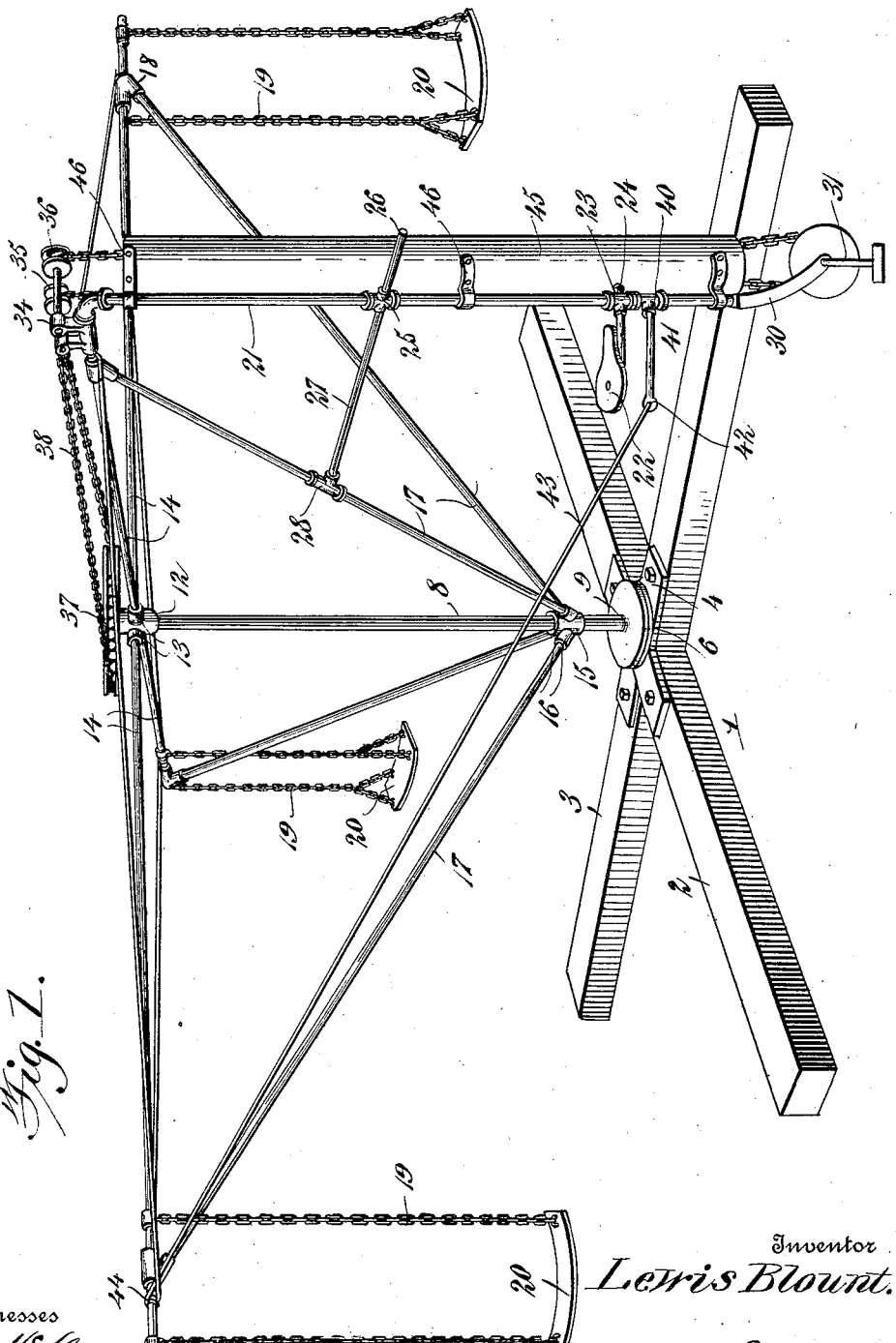

UNITED STATES PATENT OFFICE.

LEWIS BLOUNT, OF DENMARK, SOUTH CAROLINA, ASSIGNOR OF ONE-THIRD TO A. L. BLOUNT AND ONE-THIRD TO T. B. WILKINSON, OF DENMARK, SOUTH CAROLINA.

MERRY-GO-ROUND.

1,070,105.          Specification of Letters Patent.          Patented Aug. 12, 1913.

Application filed August 20, 1912. Serial No. 716,053.

*To all whom it may concern:*

Be it known that I, LEWIS BLOUNT, a citizen of the United States of America, residing at Denmark, in the county of Bamberg and State of South Carolina, have invented new and useful Improvements in Merry-Go-Rounds, of which the following is a specification.

This invention relates to improvements in carousels or merry-go-rounds and has particular application to devices of the character set forth of the manually operable or pedal driven type.

In carrying out the present invention, it is my purpose to provide a merry-go-round which may be driven or operated with ease and facility by an operator thereon and which will embrace the desired features of simplicity, efficiency, durability and convenience coupled with cheapness of cost in manufacture, marketing and installation.

With the above and other objects in view, the invention consists in the construction, combination and arrangement of parts hereinafter set forth in and falling within the scope of the claim.

In the accompanying drawings; Figure 1 is a perspective view of a carousel or merry-go-round constructed in accordance with the present invention. Fig. 2 is an enlarged fragmentary view of a detail of the driving mechanism, and Fig. 3 is a sectional view through the bearing and turn table.

Referring now to the accompanying drawings in detail, the numeral 1 indicates the base which, in the present instance, is formed of two members 2 and 3 intersecting each other at right angles and fastened to each other at the intersecting portions by any suitable means in such manner as to present a flush surface. Secured to the upper surface of the base at the intersection of the members thereof is a bearing plate 4 provided on its under surface and centrally thereof with a boss 5 designed to enter a recess in the base and having the upper surface thereof formed with a circumferential flange or rib 6. Secured within the boss 5 and extending upwardly from the bearing plate is a vertical pivot post 7.

Adapted to rotate about the pivot post 7 is a frame composed, in the present instance, of a tubular shaft 8 encircling the pivot post and provided at its lower end with a turn table 9 formed with a circumferential rib 10 adapted to lie concentrically of the rib 6 on the bearing plate, suitable anti-friction bearing members such as balls 11 being interposed between the ribs 6 and 10 of the bearing plate and turn table respectively whereby the turn table and tubular shaft may rotate with the minimum resistance. Secured to the upper end of the tubular shaft is a head 12 beyond which the adjacent end of the pivot post 7 extends and formed integral with which are a plurality of radial sockets 13. Threadedly engaging the sockets 13 or otherwise fastened therein are horizontal arms 14 radiating from the hub and terminating an appropriate distance from the pivot post. Also surrounding the tubular shaft 8 at a suitable distance below the head 12 thereon and fastened thereto in any desired manner is a collar 15 provided with radial upwardly inclined sockets 16, each socket receiving one end of a diagonal brace rod 17, the latter having the free end thereof socketed within a connector 18 secured upon the respective arm 14 adjacent to the free end thereof, the brace rods 17 reinforcing the arms 14 and forming with the said arms, the tubular shaft and the turn table, the frame of the carousel.

The merry-go-round in the present instance has a capacity of four passengers including the operator and for this purpose three of the arms have suspended therefrom as by means of chains 19 or the like seats 20, while depending from the remaining arm and connected thereto in any suitable manner is a seat post 21 carrying adjacent to its lower end a saddle or other form of seat 22 adjustably connected thereto by means of a collar 23 and a set screw 24 whereby the position of the seat upon the seat post may be varied. Secured to the seat post 21 at an appropriate distance above the seat is a connector 25 and fastened to one side of such connector is a short rod 26 extending outwardly of the frame while a relatively long rod 27 has one end thereof secured to the connector 25 at a point diametrically opposite the rod 26 and the free end fastened to the adjacent diagonal brace rod 17 by means of a connector 28, the rod 26 and the portion 27 adjacent the seat post forming the handle bars for the operator while the relatively long rod also serves to reinforce the seat post and prevent wabbling thereof. The seat post 21 is preferably of hollow construction and has the inner wall at the lower end thereof threaded to receive a shank 29 carrying a yoke or fork 30 within the free ends of the arms of which is journaled a crank shaft 31 carrying a flanged sprocket wheel 32 between the arms of the yoke and pedals 33, 33 on the outer sides of the yoke arms. Connected to the arm 14 carrying the seat post 21 adjacent to the free end of such arm is a bracket 34 provided with a pair of stub shafts 35 of relatively different lengths and each carrying a guide sheave 36. Keyed to the free end of the pivot post 7 beyond the head 12 is a flanged sprocket wheel 37 of a diameter greater than the similar dimension of the sprocket wheel 32 and over the sprocket wheels 32 and 37 and the guide sheaves 36 is trained an endless chain 38, the sprocket wheels and chain forming the driving mechanism of the merry-go-round.

To take up slack in the chain the shank 29 may be moved outwardly of the seat post and in order to lock such shank in the desired adjusted position, a lock nut 39 is employed and is threaded onto the shank and adapted to bind against the adjacent end of the seat post. Surrounding the seat post 21 at the lower end thereof is a collar 40 provided with a radially extending arm 41 terminating in an eye 42 to which is connected one end of a guy wire or the like 43, the free end of the latter being connected as at 44 to the arm 14 immediately at the rear of the arm carrying the seat post. By means of this construction, forward movement of the seat post in the operation of the machine is eliminated. The vertical runs of the chain 38 are incased in a tube or the like 45 fastened to the seat post by means of brackets 46 and extending from a point adjacent to the upper end of the seat post to a point in proximity to the lower sprocket wheel, the tube forming a guard so that the clothes of the operator will not become entangled in the chain.

From the foregoing description taken in connection with the accompanying drawings, the construction and mode of operation of my invention will be readily apparent. Assuming an operator to be upon the seat 22 and rotating the sprocket wheel 32 by means of the pedals 33, motion will be imparted to the frame through the medium of the chain 38 and sprocket 37 whereby the tubular shaft will be rotated about the pivot post, the turn table revolving upon the ball bearings and relatively to the bearing plate. When it is desired to take up slack in the chain, the yoke 30 bearing the sprocket wheel 32 is moved away from or outwardly of the seat post, the seat 22 being then moved downwardly on the seat post so that the seat and pedals will remain approximately the same distance apart. Should it be desired to adjust the seat to accommodate various operators, such seat may be elevated or lowered on the seat post and relatively to the sprocket wheel 32.

While I have herein shown and described one preferred form of my invention by way of illustration, I desire it to be understood that I do not limit or confine myself to the precise details of construction, herein described and delineated, as modification and variation may be made within the scope of the claim and without departing from the spirit of the invention.

I claim:

In a merry-go-round, a base, a vertical pivot post upstanding from the base, a tubular shaft surrounding said post and adapted to rotate thereabout, arms radiating from said shaft, passenger seats depending from certain of said arms, a seat post depending from the remaining arm, and having the lower end thereof threaded interiorly, a driving mechanism comprising a sprocket wheel rigidly secured to the free end of said pivot post, a second sprocket wheel, a yoke carrying the last-mentioned sprocket wheel, a shank on said yoke and in engagement with the threaded portion of said seat post, and a chain trained over said sprocket wheels, said shank permitting the slack in the chain to be taken up.

In testimony whereof I affix my signature in presence of two witnesses.

LEWIS BLOUNT.

Witnesses:
W. E. Free,
T. B. Wilkinson.

Copies of this patent may be obtained for five cents each, by addressing the "Commissioner of Patents, Washington, D. C."